United States Patent [19]

Bohnet et al.

[11] Patent Number: 5,316,419
[45] Date of Patent: May 31, 1994

[54] DEVICE FOR MAKING A DRILLED HOLE WITH AN UNDERCUT

[75] Inventors: Hartmut Bohnet, Waldachtal 3/Tumlingen; Willi Haug, Freudenstadt/Musbach; Stefan Lind, Waldachtal 3/Tumlingen, all of Fed. Rep. of Germany

[73] Assignee: fischerwerke Artur Fischer GmbH & Co. KG., Waldachtal 3/Tumlingen, Fed. Rep. of Germany

[21] Appl. No.: 51,467

[22] Filed: Apr. 22, 1993

[30] Foreign Application Priority Data

May 5, 1992 [DE] Fed. Rep. of Germany ....... 4214343

[51] Int. Cl.[5] .............................................. B23B 41/00
[52] U.S. Cl. ....................................... 408/236; 279/6; 408/147; 409/143; 409/201
[58] Field of Search ................ 408/88, 147, 180, 236, 408/237, 186, 187, 188, 238, 239 R, 239 A, 240, 199, 145; 409/143, 201; 279/6

[56] References Cited

U.S. PATENT DOCUMENTS

| 3,978,765 | 9/1976 | Scaduto | 279/6 X |
| 5,226,763 | 7/1993 | Lind | 408/147 X |

FOREIGN PATENT DOCUMENTS

| 1552290 | 4/1970 | Fed. Rep. of Germany . |
| 3206387 | 9/1983 | Fed. Rep. of Germany . |
| 3704491 | 8/1988 | Fed. Rep. of Germany . |
| 9104326 | 7/1991 | Fed. Rep. of Germany . |
| 4004485 | 8/1991 | Fed. Rep. of Germany . |

*Primary Examiner*—Steven C. Bishop
*Attorney, Agent, or Firm*—Michael J. Striker

[57] ABSTRACT

Device for producing a drilled hole with an undercut in a facing panel, consisting of a drilling machine and a drilling tool for forming the drilled hole connected to the drilling machine via an adapter for transferring torque; and a holding device of a supporting stand having a swivel bearing for holding the drilling machine so that it can swivel with the drilling tool attached to it. To extend the service life of the drilling tool the adapter consists of a drive part connected to the drilling machine so as to transfer torque and a tool holder connectable with the drive part and a device for releasably securing the tool holder to the drive part so that the center line of the tool holder is inclined relative to the center line of the drive part, which is aligned with the drive axis of the drilling machine, so that only a portion of the circumference of the drilling tool engages the panel during formation of the drilled hole. When the drilling tool is not being driven to form the drilled hole, the tool holder can be detached from the drive part, rotated relative to it and resecured to it so that a fresh engagement region of the drilling tool replaces a worn engagement region.

8 Claims, 2 Drawing Sheets

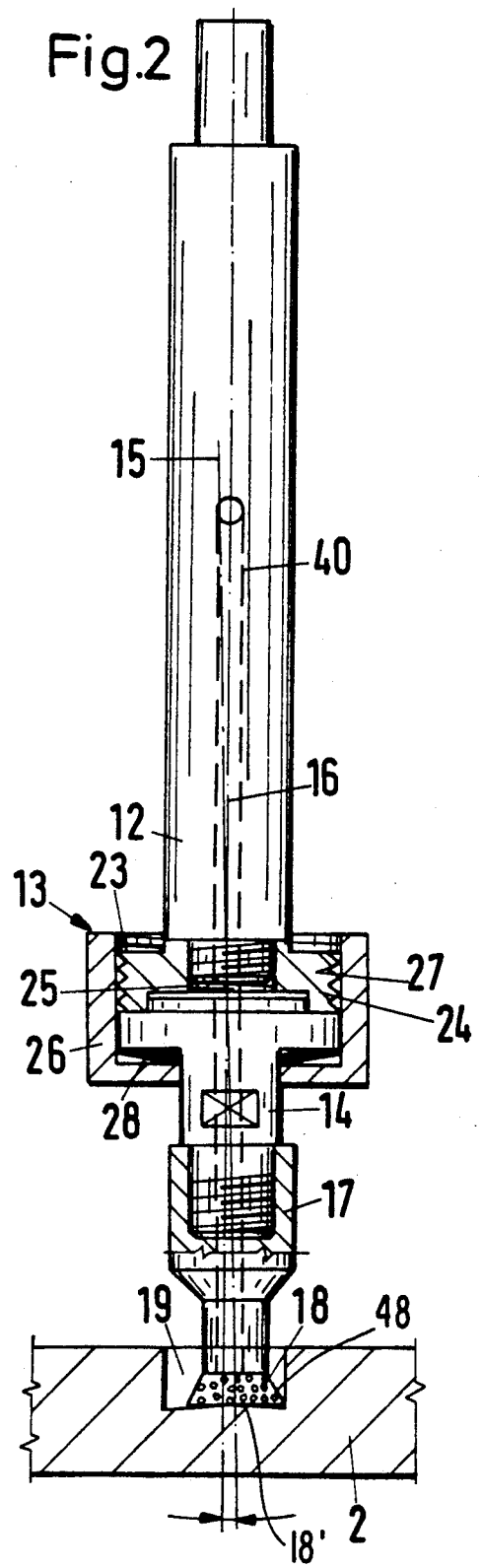
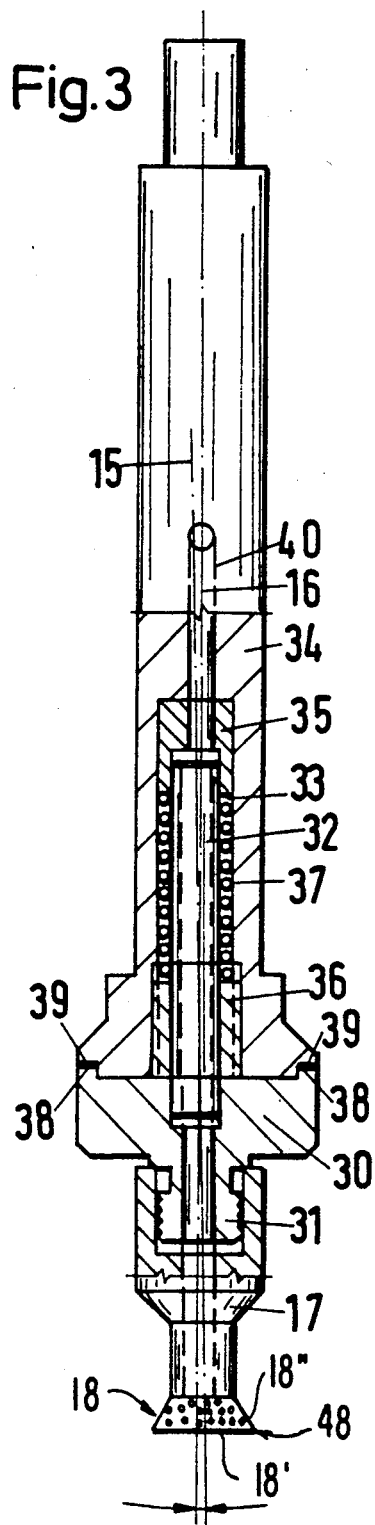

DEVICE FOR MAKING A DRILLED HOLE WITH AN UNDERCUT

BACKGROUND OF THE INVENTION

The present invention relates to a device for making a drilled hole with an undercut, particularly in a facing panel made of ceramics, stone, concrete or the like.

A known device for making a drilled hole with an undercut consists of a drilling machine for producing a torque, a drilling tool for engaging a facing panel to form a drilled hole therein; holding means of a supporting stand having a swivel bearing for receiving and mounting the drilling machine so that it can swivel with the drilling tool attached to it and an adapter receiving the drilling tool, which is connectable to the drilling tool and the drilling machine so as to transfer torque from the drilling machine to the drilling tool.

To produce a drilled hole with an undercut, devices are known which have a bearing bush with a concave recess in which a drilling tool provided with a convex collar is supported and mounted so as to swivel. By swivelling out the drilling tool while simultaneously performing a stirring movement, lateral cutting edges provided on the drilling tool ream out an undercut in the region of the bottom of the drilled hole. An expansible fixing plug with an expansible sleeve can be inserted and fixed in the undercut in an interlocking manner.

Such drilled holes with an undercut can also be made in a facing panel or similar structure, but in that case the undercut must be made very exactly, so that, when an expansible anchor is inserted and expanded, the expansion pressure that is produced is not too great. To produce an exact undercut, these devices are designed to allow an automatic, machine-controlled swivelling. In addition, drilling tools that have a drilling head set with diamond chips are used. When the drilling tool clamped in alignment with the drive axis of the drilling machine digs into the facing panel, the entire end face of the truncated cone-shaped drilling head comes into engagement. This requires a high contact pressure of the drilling tool, which leads to the diamond chips becoming prematurely blunt, because of the slower cutting speed in the center of the end face of the drilling tool. This considerably reduces the service life of the drilling tool.

SUMMARY THE INVENTION

It is an object of the present invention to provide an improved device for making a drilled hole with an undercut in a facing panel by an automatic and machine-controlled swivelling out action which provides an improved service life of the drilling tool used for making the undercut.

According to the invention, the device consists of a drilling machine, a drilling tool for engaging a facing panel to form a drilled hole therein; holding means of a supporting stand having a swivel bearing for receiving and holding the drilling machine so that it can swivel with the drilling tool attached to it; an adapter connectable to the drilling tool and the drilling machine so as to transfer torque from the drilling machine to the drilling tool. This swivel bearing comprises a bearing bush held fixed in the holding means and a guide sleeve fixedly joined to the drilling machine. The adapter consists of a drive part having a center line, the drive part being connected to the drilling machine for transfer of torque, and a tool holder connectable to the drive part and also having a center line, the drilling tool being fixedly connected to the tool holder, and means for detachably securing the tool holder to the drive part so that the center line of the tool holder is inclined relative to the center line of the drive part, which is aligned with the drive axis of the drilling machine and, when the drilling tool is not be used for forming the drilled hole, for rotating the tool holder with the drilling tool relative to the drive part so that a worn engagement region of the drilling tool can be replaced by another engagement region.

The drive part of the adapter connected in alignment with the drive axis of the drilling machine transfers torque of the drilling machine to the tool holder to which the drilling tool is nonrotatably attached. Since the center line of the tool holder, and also the drilling tool attached to it, is inclined relative to the center line of the drive part, the end face of the drilling tool digs or sinks lopsidedly into the facing panel being drilled in operation. The mid-point of the drilling tool thus gyrates in a circle about the mid-point of the bore. The end face of the drilling tool, which is simultaneously inclined at an angle, produces a shallow, conical bottom of the drilled hole, and therefore a partial engagement of the end face and outer face of the drilling tool. The end face of the drilling tool, which is simultaneously inclined at an angle, produces a shallow, conical bottom of the drilled hole, and there is a partial engagement of the end face and side surfaces of the drilling tool. The engagement region at the end face of the drilling tool corresponds to a sector of a circle, the mid-point angle of which is about 60° with an angular displacement between the drive part and the tool holder of about 2°. About a sixth of the end face of the drilling tool is therefore involved in the drilling operation. This allows the contact pressure to be reduced considerably with the same drill feed, and about one sixth of the drill bit area is to be used. Once this engagement region is worn out, by rotating the tool holder relative to the drive part an as yet unused engagement region of the drill bit is brought into engagement. This rotation is repeated until the entire circumference of the drilling tool has been uniformly worn. Because of the angular inclination and the ability of repositioning the tool holder relative to the drive part by rotation, a service life that is four to six times that of a drilling tool whose drilling tool axis coincides with the drive axis of the drilling machine is achieved. Reduction of the contact pressure at the same time puts less strain on the device itself.

Advantageously, the angular displacement or inclination angle between the center lines of the tool holder and the drive part is between 1.5° and 3°. The engagement region of the drilling tool at its end face is therefore about one quarter to one sixth of the total circumferential area.

The tool holder is held in a mounting of the drive part that is structured to provide the angular displacement. The tool holder can be clamped in the mounting with a frictional or interlocking connection by spring means, e.g. a plate spring or a compression spring, so that a transfer of torque from the drive part to the tool holder, and therefore to the drilling tool, is achieved. In the case of a frictional clamping, rotational advancement of the tool holder is infinitely variable and can be set to individual requirements. In the case of an interlocking clamping, for example, by a toothed configuration or a coupling using pins and recesses, the number of teeth or coupling claws can predetermine a specific angular dimension for the rotational advancement of the tool holder. A division into quarters or sixths is preferred, which allows optimum exploitation of the drill bit areas depending on the angular displacement.

BRIEF DESCRIPTION OF THE DRAWING

The objects, features and advantages of the present invention will now be illustrated in more detail by the following detailed description, reference being made to the accompanying drawing in which:

FIG. 2 is a schematic cross-sectional view of a two-part adapter in a preferred embodiment of the device according to the invention, in which there is a detachable frictional connection between the tool holder and drive part, and FIG. 3 is a schematic cross-sectional view of an adapter in another preferred embodiment of the device according to the invention in which there is a releasable interlocking connection between the tool holder and the drive part.

DESCRIPTION OF THE PREFERRED EMBODIMENTS

Figure 1:
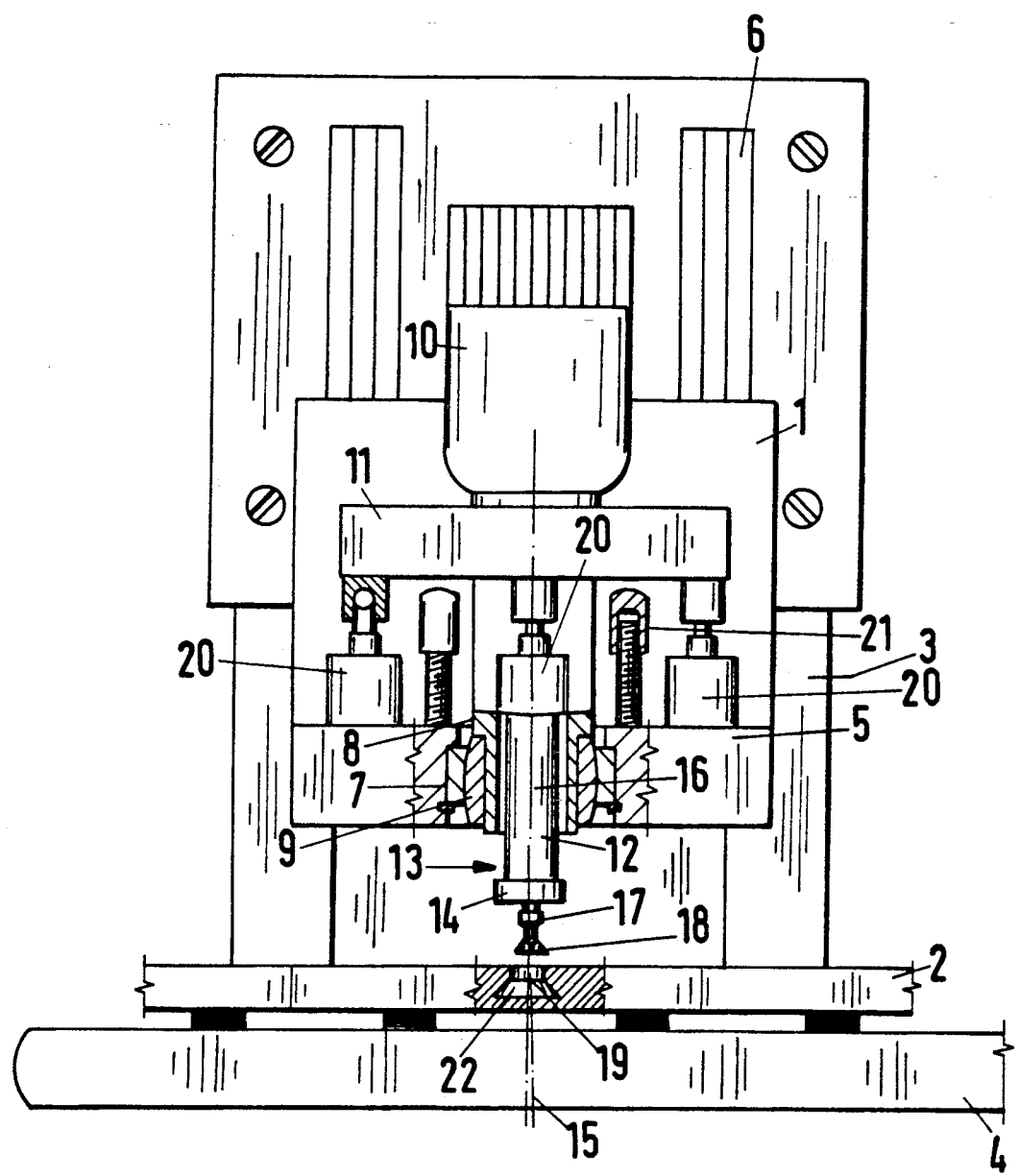
FIG. 1 is a front elevational view of a device for making a drilled hole with an undercut according to the invention.

The device 1 for making a drilled hole with an undercut in a facing panel 2 is mounted on a supporting stand 3, which has a supporting base 4 for the facing panel 2, which, if desired, can be provided with a clamping mechanism for the panel 2. Two guide rails, which engage in profiled guides 6 secured to the supporting stand 3, are arranged on holding means 5 and provide guidance for vertical movement.

The holding means 5 contains a swivel bearing which comprises a bearing bush 7 held fixed in the holding means 5 and a ball-like collar 9 arranged on the guide sleeve 8. The guide sleeve 8 is fixedly joined to the drilling machine 10 and the circular wobble plate 11. The drive part 12 of the adapter 13 is clamped in a drill chuck of the drilling machine 10 so as to be rotatably drivable by the drilling machine. A tool holder 14 is connected to the lower end of the drive part 12. The center line 15 of the tool holder 14 has an angular displacement or inclination of about 2° from the center line 16 of the drive part 12, the center line 16 be aligned or coincident with drive axis of the drilling machine 10. The drilling tool 17, which is set with diamond chips, has a truncated cone-shaped drilling head 18 with a substantially flat end face 18' and conical side surfaces 18". The drilling tool 17 is screwed onto the tool holder 14.

To drill a cylindrical drilled hole 19 in the facing panel 2, the holding means 5 with the drilling machine 10 and attached drilling tool 17 is moved downwards by an unshown rack-and-pinion drive, a lever or similar means, with the wobble plate 11 oriented horizontally and the drilling machine 10 switched on. When the rotating drilling tool 17 engages the facing panel 2, the cylindrical drilled hole 19 is formed. When the drilled hole 19 has reached the desired depth, with the drilling machine running the wobble plate 11 is brought into an inclined position by actuating and controlling one cylinder 20 until the wobble plate 11 rests on the stops 21 opposite this cylinder. The axis of the drilling machine and of the drilling tool are then swung in the opposite direction about the center point of the swivel bearing. The successively controlled actuation of the cylinders which are arranged in a circle around the adapter, in a clockwise or an anticlockwise direction creates a wobbling motion which results in the undercut 22 of the drilled hole 19 being reamed out. After one or two revolutions, the wobble plate is returned to its horizontal position and the drilling tool is withdrawn from the drilled hole.

In the adapter 13 shown in FIG. 2, a threaded stopper 24, which is screwed into the internal thread 25 of the union nut 26, is screwed onto the threaded portion 23 of the drive part 12.

The external thread 27 of the threaded stopper 24 is made with an angular displacement relative to the internal thread 25 so that the center line 15 of the union nut 26 screwed onto the threaded stopper 24 deviates from the center line 16 of the drive part 12 by the same angular amount. The end face of the threaded stopper 24 acting as a stop face for the tool holder 14 is at right angles to the external thread 27 of the threaded stopper 24. The tool holder 14 therefore also assumes the angular position or inclination predetermined by the external thread 27 of the threaded stopper 24 relative to the center line 16 of the drive part 12. The drilling tool 17 screwed onto the tool holder 14, and provided with an internal thread for that purpose, aligns with the center line 15 of the tool holder 14, so that the end face of the drilling head 18 enters into the facing panel lopsidedly in accordance with this angular position or inclination. The inclined position of the end face of the drilling head 18 and the simultaneous rotation of the drilling tool reams out the bottom of the drilled hole with a shallow conical tip of the drilling tool, which engages the panel material with an engagement region 48 shaped approximately like a sector of a circle. In the embodiment of FIG. 2 the plate spring 28 clamps the tool holder 14 so firmly against the stop face of the threaded stopper 24 that the resulting friction causes transfer of torque from the drive part 12 to the tool holder 14 and consequently to the drilling tool 17.

Once the initially selected engagement region 48 of the drilling head 18 has been worn by use, the tool holder 14 is rotationally advanced when the drilling machine is not operating by an amount between 60 and 90°. An unused drilling tool engagement region is then presented for engagement. An angular displacement of about 2° produces an engagement region 48 of the drilling tool in the shape of a sector of a circle with a center point angle of about 60°. Depending on the angular position, which can be varied preferably between 1.5° and 3°, four to eight engagement regions or machining areas of the drilling tool 17 can be brought into engagement.

In the embodiment illustrated in FIG. 3, the tool holder 30 has a threaded portion 31, onto which the drilling tool 17 is screwed. The tool holder 30 is held by a threaded bolt 32 in the receiving bore 33 of the drive part 34. For support, a stop nut 35 is screwed onto the end of the threaded bolt 32. A compression spring 37 bearing against the closure stopper 36 engages the stop nut 35. The tool holder 30 is clamped against the end surfaces of the drive part 34 by the compression spring. The center line 15 of the receiving bore 33 has the desired angular displacement or inclination from the center line 16 of the drive part 34. The end face of the drive part 34 is at right angles to the center line 15 of the receiving bore 33, so that the tool holder 30, and with it the drilling tool 17, also have the same angular displacement or inclination as the receiving bore 33. The tool holder 30 is prevented from rotating on the drive part by a releasable interlocking connection between the tool holder 30 and the drive part 34 by pins 38 provided on the tool holder 30, which engage in suitable recesses 39 in the end face of the drive part 34. The provision of, for example, four pins or projections 38 and four recesses 39 produces a circumferential division into four, which enables the tool holder 30 to be rotationally advanced four times. In this manner four operating zones of the tool can be used. If it is desirable to bring more than four operating zones into engagement, then the number of divisions must be increased correspondingly.

By providing the drive part 12, 34, the tool holder 14, 30 and the drilling tool 17 with a central continuous bore 40 water can be fed to the drilled hole 19 to rinse out the drilled hole and cool the drilling head.

While the invention has been illustrated and described as embodied in a device for making a drilled hole with an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

What is claimed is:

1. Device for producing a drilled hole with an undercut, said device comprising of:
    a drilling machine for producing a torque and having a drive axis;
    a drilling tool structured to form a drilled hole;
    holding means of a supporting stand, said holding means having a swivel bearing for receiving and mounting said drilling machine so that said drilling machine and said drilling tool can swivel, said swivel bearing comprising a bearing bush held fixed in said holding means and a guide sleeve fixedly joined to said drilling machine;
    an adapter connectable to the drilling tool and the drilling machine so as to transfer said torque from the drilling machine to the drilling tool, said adapter consisting of a drive part having a center line connectable to the drilling machine and a tool holder connectable to the drive part and also having a center line, the drilling tool being attachable to the tool holder so as to be aligned with the tool holder, and means for detachably securing the tool holder to the drive part so that the center line of the tool holder is inclined relative to the center line of the drive part, said center line of the drive part being aligned with the drive axis of the drilling machine and, when said drilling tool is not in engagement with the facing panel and forming the drilled hole, for rotating the tool holder with the drilling tool relative to the drive part so that a worn engagement region of said drilling tool can be replaced by another engagement region.

2. Device as defined in claim 1, wherein said means for detachably securing the tool holder to the drive part is structured so that the center line of the tool holder is inclined between 1.5° to 3° to the center line of the drive part.

3. Device as defined in claim 1, further comprising a spring means located in said adapter so as to clamp said tool holder and said drive part so that said drive part transfers said torque to said tool holder.

4. Device as defined in claim 3, wherein said tool holder is frictionally connected with said drive part and said spring means is a plate spring.

5. Device as defined in claim 1, wherein said tool holder is connectable with said drive part by interlocking means so that said drive part transfers said torque to said tool holder.

6. Device as defined in claim 5, wherein said interlocking means comprises pins on said tool holder, said drive part being provided with recesses in which said pins engage when said tool holder is connected with said drive part.

7. Device as defined in claim 1, wherein said drilling tool comprises a truncated cone-shaped drilling head having a substantially flat end face and conical side surfaces.

8. Device as defined in claim 7, wherein said drilling tool is set with diamond chips.

* * * * *